United States Patent [19]

Bills

[11] 3,756,324
[45] Sept. 4, 1973

[54] MOTORIZED CULTIVATOR
[76] Inventor: Howard Bills, R.F.D. No. 1, Box 268, Imperial, Pa. 15222
[22] Filed: Dec. 18, 1970
[21] Appl. No.: 99,452

[52] U.S. Cl. .................................. 172/40, 172/42
[51] Int. Cl. ........................................... A01b 35/00
[58] Field of Search .................... 172/40, 41, 42, 21

[56] References Cited
UNITED STATES PATENTS

| | | | |
|---|---|---|---|
| 3,057,412 | 10/1962 | Hovis | 172/42 |
| 2,517,733 | 8/1950 | Takats | 172/40 |
| 3,339,641 | 9/1967 | Carter | 172/40 |
| 3,204,704 | 9/1965 | Goette | 172/42 X |
| 3,396,804 | 8/1968 | Rogers | 172/40 |
| 2,613,582 | 10/1952 | Harshberger | 172/40 |
| 2,550,522 | 4/1951 | Bolongaro | 172/40 |

Primary Examiner—Robert E. Pulfrey
Assistant Examiner—Stephen C. Pellegrino
Attorney—Carothers and Carothers

[57] ABSTRACT

A motorized hand-operated cultivator which is drawn towards the operator. A vertically reciprocatory member is provided with a set of horizontally spaced tines which extend outwardly through reverse curvature from the cultivator for penetration into the subsoil as the carriage is drawn towards the operator. The reciprocation of stroke of the tines is variable in both length and frequency as well as its depth of penetration.

3 Claims, 2 Drawing Figures

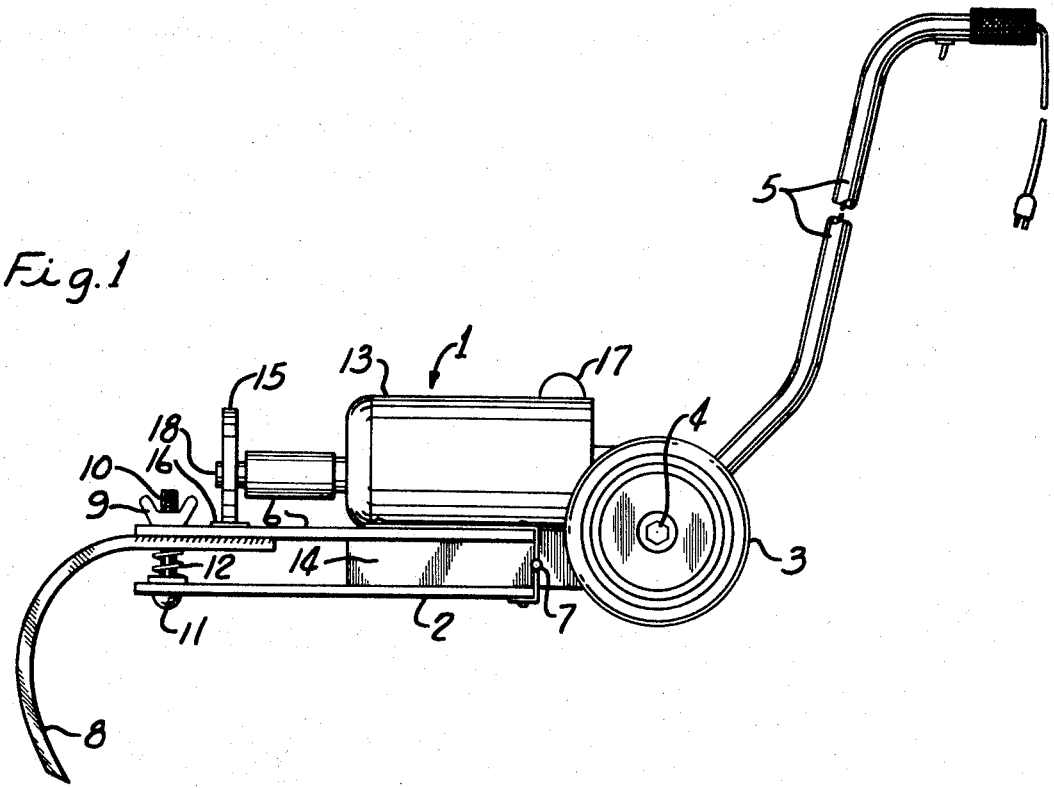
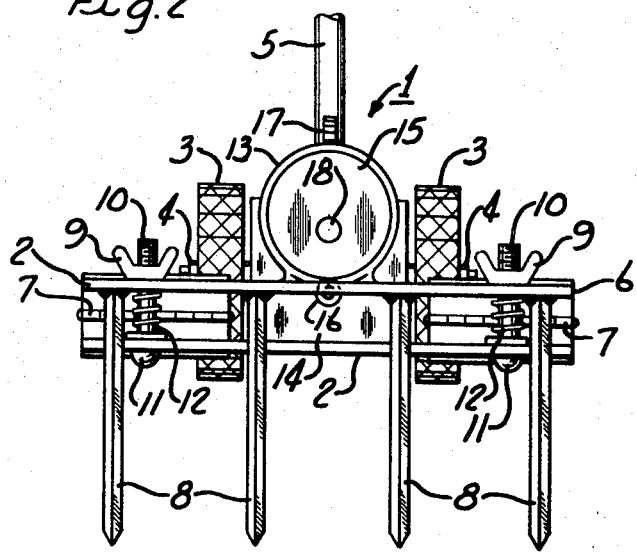

3,756,324

MOTORIZED CULTIVATOR

BACKGROUND OF THE INVENTION

1. Field of Invention

This invention relates generally to cultivation and more particularly to hand-operated motorized cultivators for garden use.

2. Description of the Prior Art

Many motorized hand-operated cultivators for garden use have been heretofore developed. However, such cultivators have proved to be inadequate and are not versatile in their application to different soil conditions present and the resultant soil conditions desired for a specific operation.

It has been long known that cultivation to crops is greatly advantageous as the hard soil surface is thus made into a fine layer of loose soil which prevents the capillary action of moisture lying thereunder to the surface for evaporation and thereby preserves moisture for the use of the plants or crops.

The motorized cultivators heretofore devised are principally designed to advance in the direction of the cultivating implements. Accordingly, as the operator advances the tool or cultivator, he is trampling down the soil which has just been cultivated thereby defeating the purpose of the machine.

Such cultivators are illustrated in the Bolongaro U.S. Pat. No. 2,550,522 and the Harshberger U.S. Pat. No. 2,613,582. Referring to the former, Bolongaro discloses a reciprocatory hoe which is motorized and hand-operated. Such hoes must continue their operation in the foward direction or away from the operator in order to properly break up the soil with the greatest ease by the operator. Accordingly, as Bolongaro's machine is advanced the operator is continually trampling down the broken-up soil thereby partly defeating the results of his reciprocatory hoe. Furthermore, the action of a hoe blade such as disclosed in this patent is such that it continually breaks the top surface of the soil with each stroke rather than breaking the looser subsoil thereunder first to subsequently break the harder and more encrusted top soil. Thus, the action of such a hoe blade or blunt tine is very slow and limits the speed with which the operator may work.

The Harshberger patent illustrates a garden tractor having a vibratory rake at the front end for cultivation purposes. Here again, while Harshberger teaches that his implement may be moved in either direction, he teaches that for the purpose of cultivation, the device is moved in its forward direction or away from the operator and thus the operator compacts the soil which has just been cultivated by the implement which he is operating. Furthermore, Harshberger teaches the use of a vibratory action as opposed to reciprocatory movement and he is thus continually operating his rake in much the same manner as a hoe blade as shown in the Bolongaro patent such that it must continually break the hard encrusted surface with each advancing stroke with its blunt tines thereby slowing the process.

Furthermore, the motorized cultivators of the prior art provide no means for varying the type of reciprocatory action taking place in order to provide the desired cultivation results for the particular soil conditions then present.

SUMMARY OF THE PRESENT INVENTION

The motorized hand-operated cultivator of the present invention eliminates these disadvantages and comprises a carriage which is adapted for movement over the ground to be cultivated and has a handle attached to the forward end of the carriage for drawing the carriage toward the operator. A vertically reciprocatory member is pivotally secured to the carriage and a motor on the carriage is operable to vertically reciprocate a member which has a set of horizontally spaced and pointed tines secured thereto for vertical reciprocation. These tines extend rearwardly from the opposite end of the carriage and continue their extension in a downward reverse curvature such that they terminate pointing downwardly and forward toward the operator at a level lower than the carriage. The cultivator is thus drawn toward the operator thereby eliminating the possibility of the operator compacting the soil with his feet after cultivation by the tool.

The tines must be relatively sharp and spaced sufficiently far apart to prevent the tendency of the implement to drag refuse along with the device ahead of the tines such as would be the situation if the aforementioned Bolongaro or Harshberger implements were drawn toward the operator to cultivate the soil. On the other hand the tines must not be spaced so far apart that they will not properly break-up all the soil. The cultivator of the present invention breaks up the soil by a reciprocating action of the tines beneath the encrusted soil surface as the operator pulls the reciprocating tines toward him. The result is that the cultivation layer is much finer and looser than possible with a hoe blade or rake blade as disclosed by the aforementioned patents.

Furtheremore, the implement is thus not continuously attempting to break the tough encrusted soil top surface with each advancing stroke as is necessary with the devices of the prior art. The cultivating tines of the present invention work beneath the soil thereby continually breaking up the encrusted surface with greater ease thereby allowing the operator to cultivate at a much greater rate of speed.

The cultivator of the present ivnention is preferably provided with the means to vary the length of the reciprocation stroke of the cultivating tines and may also be provided with means to vary the frequency of the stroke as desired. In this manner, the action of the cultivator may be varried to properly meet the soil conditions present to give the correct results for the final soil conditions desired. The condition of the soil may thus be dictated by the length of the stroke while the depth of the penetration may remain constant; of course, the depth of penetration is also adjustable as desired. The cultivating action of the cultivator of the present invention is such that the soil tends to "bubble" upwardly between the tines thereby providing a more uniform and much more finely broken-up soil surface than possible with the hoe type action of the aforementioned references.

Other objects and advantages appear hereinafter in the following description and claims.

The accompanying drawings show, for the purpose of exemplification without limiting the invention or the claims thereto, certain practical embodiments illustrating the principles of this invention wherein:

FIG. 1 is a view in side elevation of the hand-operated motorized cultivator of the present invention.

FIG. 2 is a rear view in elevation of the motorized cultivator shown in FIG. 1.

Referring to the figures, the motorized cultivator 1 is provided with a carriage 2 which is adapted for travel over the ground to be cultivated by means of the wheels 3 which are journaled to their common axel 4 which is in turn secured to the carriage 2. Handle 5 is secured to carriage 2 and extends rearwardly therefrom to permit the operator to draw the cultivator toward himself as he is cultivating.

A reciprocatory member in the form of a pivotted plate 6 is pivotally secured to the carriage 2 as indicated at 7. This plate is provided at its outermost end with a set of horizontally spaced tines 8 which extend rearwardly and then through reverse curvature such that they terminate at their pointed end in a downward and forward direction at a level lower than the carriage 2 and the wheels 3.

The upward pivotal movement of plate 6 is limited by the adjustable stops or wing nuts 9 threadably secured to bolts 10 that pass through clearance holes in plate 6 and are secured at their lower end to the carriage 2 as indicated at 11. The pivotted plates 6 are urged normally to its uppermost limits by compression springs 12 which are placed coaxially about bolts 10 and interposed between the carriage 2 and the undersurface of pivotted plates 6.

Bolts 10 of course may be replaced by a similar single arrangement consisting of one bolt and spring which would be centrally located thereby eliminating the necessity of having two adjustment wing nuts 9.

An electric motor 13 is rigidly secured to the carriage 2 via the mounting block 14 which passes though a large spacing or opening in the pivotted plate 6 in order to permit the latter to pivot freely in its vertical direction. Motor 13 rotates the shaft 18 which in turn rotates eccentric 15.

The outer cam surface of eccentric 15 continually engages a sleeve roller bearing 16 retained in the pivotted plate 6 to provide frictionless engagement between the cam surface and eccentric 15 and the plate 6. As motor 13 rotates eccentric 15, the plate 6 together with tines 8 is caused to reciprocate vertically to provide the necessary cultivating action of the tines, the tips of which are positioned beneath the encrusted soil surface.

The electric cord for supplying electricity to motor 13 is fed through the hollow handle 5 and emerges from the outer end thereof for connection to a common 110 volt a.c. supply source.

The wing nuts 9 may be readily adjusted in order to vary the length of the reciprocatory stroke of the tines 8 to meet the required cultivating conditions. Furthermore, electric motor 13 is provided with means to regulate its speed which may be varied by turning knob 17. Such regulators are well-known in the art of electric motors. In this manner, the operator may also vary the frequency of reciprocation for the specific soil conditions.

The depth of penetration of the tines is varied by the operator by merely raising or lowering the handle 5 to the desired position.

The eccentric 15 illustrated has a trough of approximately ¼ inch and the preferable r.p.m. is 110 to 120 thereby providing a reciprocatory stroke of the tines which is 110 to 120 strokes per minute.

Adjustable tines 8 should have a spacing of at least approximately two inches as a spacing which is too close for the soil conditions present will tend to drag the refuse along the operator ahead of the tines and a spacing which is too far apart will not properly nor finely break-up all the soil.

As the action of the sharp tine points is under the encrusted upper soil surface, the harder overlying soil surface is much more easily broken-up than with the hoe type action of prior inventions and the cultivator of the present invention thus cultivates the same amount of soil as those of prior art with much less resistance. This action under the encrusted soil surface is further permitted by reason of the true reverse curvature of the tines as compared to the prior art disclosures which permits the tine points to penetrate laterally into the softer subsoil under the encrusted surface and reciprocate thereunder to "bubble" the soil upwardly through the tines to break the encrusted surface which is not possible by the mere angled hoe type cultivating heads such as disclosed in the aforementioned Harshberger and Bolongaro patents.

I claim:

1. A motorized hand-operated cultivator comprising a carriage adapted for movement over ground to be cultivated, a handle attached to the forward end of said carriage for drawing the same toward the operator, a vertically reciprocatory member pivotally secured to said carriage, motor means mounted on said carriage, cam means driven by said motor means and in driving engagement with said member to vertically reciprocate the same about said pivot, a set of horizontally spaced and pointed tines secured to said reciprocatory member for vertical reciprocation therewith and extending rearwardly from the opposite end of said carriage, said tines continuing their extension in a downward reverse curvature such that they terminate pointing downwardly and forward at a level lower than said carriage with a horizontal spacing between tines which is sufficiently small to properly break-up the soil yet sufficiently large to prevent the dragging of refuse therewith, adjustable means rigidly attached to said carriage and having stop means engageable with said reciprocatory member to adjustably limit the maximum reciprocation stroke length of said reciprocatory member, and spring means continually urging said reciprocatory member for engagement with said stop means.

2. The cultivator of claim 1 characterized by adjustment means on said carriage to variably adjust the frequency of reciprocation of said reciprocating member.

3. The cultivator of claim 2 wherein said motor means has an adjustable speed control to provide said adjustment means.

* * * * *